(12) United States Patent
Qin

(10) Patent No.: US 11,128,821 B2
(45) Date of Patent: Sep. 21, 2021

(54) CROSS-ROW TIME DELAY INTEGRATION METHOD, APPARATUS AND CAMERA

(71) Applicant: CHENGDU ZHONGXIN HUARUI TECHNOLOGY CO., LTD., Sichuan (CN)

(72) Inventor: Jun Qin, Sichuan (CN)

(73) Assignee: CHENGDU ZHONGXIN HUARUI TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/023,270

(22) Filed: Sep. 16, 2020

(65) Prior Publication Data

US 2020/0412984 A1 Dec. 31, 2020

Related U.S. Application Data

(63) Continuation of application No. PCT/CN2019/078513, filed on Mar. 18, 2019.

(30) Foreign Application Priority Data

Mar. 16, 2018 (CN) .......................... 201810217621.3

(51) Int. Cl.
*H04N 5/353* (2011.01)
*H04N 5/372* (2011.01)

(52) U.S. Cl.
CPC ......... *H04N 5/353* (2013.01); *H04N 5/37206* (2013.01); *H04N 5/37213* (2013.01)

(58) Field of Classification Search
None
See application file for complete search history.

(56) References Cited

U.S. PATENT DOCUMENTS

| 6,563,539 B1 | 5/2003 | Lefevre | |
|---|---|---|---|
| 2002/0149674 A1* | 10/2002 | Mathews | H04N 5/37206 348/144 |
| 2012/0287256 A1* | 11/2012 | Hulsken | G02B 21/361 348/79 |

(Continued)

FOREIGN PATENT DOCUMENTS

| CN | 102209198 A | 10/2011 |
|---|---|---|
| CN | 104904194 A | 9/2015 |

(Continued)

*Primary Examiner* — Quan Pham

(57) ABSTRACT

The application provides a cross-row time delay integral method, apparatus and camera. The method includes obtaining a first stage integral energy in an i-th target region from an i-th row of a first integral piece domain; transferring the first stage integral energy across rows to an i-th row of a second integral piece domain; obtaining the first stage integral energy and an second stage integral energy accumulated in the i-th target region from the i-th row of the second integral piece domain, after an integration period; outputting an image of the i-th target region containing the first stage integral energy and the second stage integral energy. The application performs cross-row integration through the energy obtained by imaging, the shooting of the target can be carried out in a higher-speed environment, the method can be implemented on the existing photoelectric device, and the method has excellent imaging quality and wide applicability.

15 Claims, 6 Drawing Sheets

(56) References Cited

U.S. PATENT DOCUMENTS

2015/0054921 A1* 2/2015 Dixon .................. G02B 21/006
348/46
2017/0310918 A1 10/2017 Shaffer et al.

FOREIGN PATENT DOCUMENTS

| | | | |
|---|---|---|---|
| CN | 105791716 | A | 7/2016 |
| CN | 106101583 | A | 11/2016 |
| CN | 106603927 | A | 4/2017 |
| JP | 2011024082 | A | 2/2011 |

* cited by examiner

CROSS-ROW TIME DELAY INTEGRATION METHOD, APPARATUS AND CAMERA

CROSS-REFERENCE TO RELATED APPLICATIONS

The application is a continuation of International Application No. PCT/CN2019/078513, filed on Mar. 18, 2019, which claims priority to Chinese patent application No. 2018102176213, entitled "CROSS-ROW TIME DELAY INTEGRATION METHOD, APPARATUS, AND CAMERA" filed on Mar. 16, 2018, the entire contents of which are incorporated herein by reference.

TECHNICAL FIELD

The application relates to the technical field of high-speed imaging, in particular to a cross-row time delay integration method, apparatus and camera.

BACKGROUND OF THE DISCLOSURE

TDI (Time Delay Integration) imaging techniques are generally applicable to imaging objects for some cameras moving relative to a target.

An existing TDI-CCD (TDI Charge Coupled Device) camera and a TDI-CMOS (TDI Complementary metal Oxide Semiconductor) camera based on a time delay integration technology, the energy integration working mode of the TDI-CCD camera and the TDI-CMOS camera is to transfer energy from the front row to the adjacent rear row, and a row of image is output after the set integration stage is reached.

However, the refresh frequency of the TDI-CCD or the TDI-CMOS device is not infinitely high, and therefore, after the relative motion speed of the target and the camera is high to a certain value, the camera cannot work normally.

SUMMARY OF THE DISCLOSURE

The object of the application is to provide a cross-row time delay integration method and apparatus, and camera, which can effectively improve the above problems.

In the application, the integration piece domain is a division of a camera image element surface array, an imaging range corresponding to one integration piece domain forms a scene, and the i-th target region is one strip imaging region corresponding to an i-th row image in a scene covered by an integration piece domain. The x-th target region is one stripe imaging region corresponding to an x-th row image in a scene covered by an integration piece domain.

Embodiments of the application are implemented as follows:

In a first aspect, an embodiment of the application provides a cross-row time delay integration method, the method comprising: obtaining a first stage integral energy in an i-th target region from an i-th row of a first integral piece domain; transferring the first stage integral energy across rows to an i-th row of a second integral piece domain; obtaining the first stage integral energy and an second stage integral energy accumulated in the i-th target region from the i-th row of the second integral piece domain, after an integration period; outputting an image of the i-th target region containing the first stage integral energy and the second stage integral energy.

Optionally, a camera array of the cross-row time delay integration camera is divided into a plurality of integral piece domains used for imaging, each of the integral piece domain comprises a plurality of rows used for imaging.

Optionally, the number of rows used for imaging of each of the integral piece domain is equal.

Optionally, after the step of obtaining the first stage integral energy and an second stage integral energy accumulated in the i-th target region from the i-th row of the second integral piece domain, after an integration period, the method further includes:

transferring the first stage integral energy and the second stage integral energy accumulated across rows to an i-th row of a third integral piece domain;

obtaining the first stage integral energy, the second stage integral energy and the third stage integral energy accumulated in the i-th target region from the i-th row of the third integral piece domain, after an integration period;

outputting an image of the i-th target region containing the first stage integral energy, the second stage integral energy and the third stage integral energy.

Optionally, the method further includes:

while obtaining the first stage integral energy in the i-th target region from an i-th row of the first integral piece domain, obtaining an I stage integral energy in an x-th target region from an x-th row of the first integral piece domain, wherein the x-th row is any row other than the i-th row;

transferring the I-th stage integral energy across rows to an x-th row of the second integral piece domain;

obtaining the I-th stage integral energy and an II stage integral energy accumulated in the x-th target region from the x-th row of the second integral piece domain, after an integration period;

outputting an image of the x-th target region containing the I-th stage integral energy and the II-th stage integral energy.

Optionally, after the step of obtaining the I-th stage integral energy and an II stage integral energy accumulated in the x-th target region from the x-th row of the second integral piece domain, the method further includes:

transferring the I-th stage integral energy and the II-th stage integral energy accumulated across rows to an x-th row of a third integral piece domain;

obtaining the I-th stage integral energy, the II-th stage integral energy and a III-th stage integral energy accumulated in the x-th target region from the x-th row of the third integral piece domain, after an integration period;

outputting an image of the x-th target region containing the I-th stage integral energy, the II-th stage integral energy and the III-th stage integral energy.

Optionally, the method further includes:

accumulating an k−1 stage integral energy transferred to an i-th row of an k-th integral piece domain and energy obtained by a k-th exposure, obtaining a k stage integral image including a k stage integral energy, wherein the k stage integral energy includes an integral energy of an imaging of the i-th target region on the i-th row of the first integral piece domain in sequence up to the i-th row of the k-th integral piece domain, each of the integral piece domain includes a k stage integral image of m rows formed by an effective imaging region of m rows;

outputting the k stage integral image of m rows, imaging of k integral piece domains can share one energy collection system or use a plurality of energy collection system.

Optionally, an stage integral energy correspondingly transferred from a row of an upper integral piece domain to a row of a next integral piece domain is analog quantity or digital quantity;

the energy transferred from a photosensitive unit located at a position(i,j) in an upper integral piece domain coordinate system to a photosensitive unit located at a position (i,j) in a next integral piece domain coordinate system is transferred through a physical connection manner.

Optionally, the photosensitive unit located at a position (i,j) in the upper integral piece domain coordinate system is connected through a circuit to the photosensitive unit located at a position (i,j) in the next integral piece domain coordinate system.

Optionally, when transferring energy from a photosensitive unit located at a position(i,j) in the upper integral piece domain coordinate system to a photosensitive unit located at a position (i,j) in the next integral piece domain coordinate system, stage integral energy obtained from the upper photosensitive unit is processed through a computer and is converted to digital signals, and then is sent across rows to the next photosensitive unit.

Optionally, energy transferred from a photosensitive unit located at a position(i,j) in an upper integral piece domain coordinate system to a photosensitive unit located at a position (i,j) in a next integral piece domain coordinate system is original charge energy, or energy after processing the original charge energy.

Optionally, lens of the cross-row time delay integration camera is a cylindrical lens, or a spherical lens, or combination of cylindrical lenses, or combination of spherical lenses, or combination of cylindrical lenses and spherical lenses.

Optionally, when transferring integral energy from an upper integral piece domain to a next integral piece domain, the number of rows crossed is determined through relative motion speed between a target region and the across-row time delay integration camera, and refresh frequency of the cross-row time delay integration camera.

In a second aspect, an embodiment of the application provides a cross-row time delay integration apparatus, wherein the apparatus comprising: a first obtaining module, configured to obtain a first stage integral energy in an i-th target region from an i-th row of a first integral piece domain; a first transferring module, configured to transfer the first stage integral energy across rows to an i-th row of a second integral piece domain; a second obtaining module, configured to obtain the first stage integral energy and an second stage integral energy accumulated in the i-th target region from the i-th row of the second integral piece domain, after an integration period; a first output module, configured to output an image of the i-th target region containing the first stage integral energy and the second stage integral energy.

In a third aspect, an embodiment of the application provides a cross-row time delay integration camera, wherein the camera comprising an imaging element and a controller, the imaging element and the controller is connected, the imaging element includes a plurality of integral piece domains, each of the integral piece domain includes a plurality of rows of effective imaging region, wherein the controller is configured to respectively controlling the plurality of rows of effective imaging region for independently photoelectric conversion, energy processing, energy transfer, energy integration and image output, wherein the number of the integration piece domains, the number of rows of the effective imaging region on each of the integral piece domain, the number of rows of energy across-row transfer, and the number of stages of energy integration can be edited programmatically; under the control of the controller, the cross-row time delay integration camera implements the cross-row time delay integration method provided by the application.

According to the cross-row time delay integration method, apparatus and camera provided by the embodiment of the disclosure, when the first integration piece domain is used for imaging the first scene, the first stage integration energy of the i-th target region is obtained on the i-th row of the first integration piece domain; transferring the first stage integration energy across rows to an i-th row of a second integration piece domain; after an integration period, the second integration piece domain moves to above the first scene, and obtaining a second stage integral energy of an i-th target region of the first scene from an i-th row of the second integration piece domain; and finally, outputting an i-th target region image of i-th target region of the first scene containing the first stage integral energy and the second stage integral energy. Compared with the prior art, the application performing cross-row integration through the energy obtained by single imaging, multiple imaging of the same scene can be realized, the shooting of the target can be carried out in a higher-speed environment, the method can be implemented on the existing photoelectric device through logic programming, and the method has excellent imaging quality and wide applicability.

BRIEF DESCRIPTION OF THE DRAWINGS

In order to more clearly illustrate the technical solutions of the embodiments of the application, a brief description will now be made to the accompanying drawings, which are to be used in the embodiment, and it is to be understood that the following drawings illustrate only certain embodiments of the application and are therefore not to be considered as a limitation of scope, and for those of ordinary skill in the art, other related drawings may also be obtained from these drawings without creative efforts.

DETAILED DESCRIPTION OF EMBODIMENTS

Figure 1:
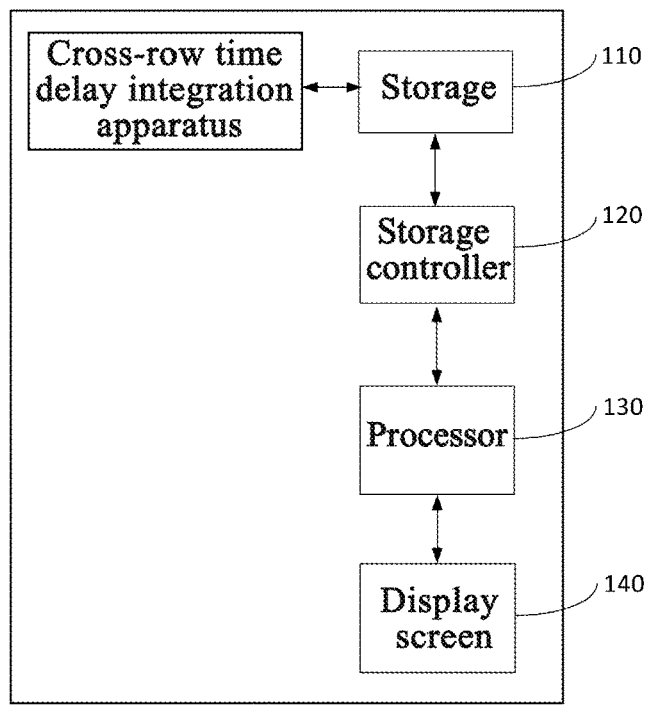
FIG. 1 is a structural block diagram of an electronic device applicable to an embodiment of the application.

The technical solutions in the embodiments of the application will be clearly and completely described in conjunction with the drawings in the embodiments of the application, and obviously, the described embodiments are merely a part of the embodiments of the application and not all embodiments. Components of embodiments of the application generally described and illustrated in the figures herein may be arranged and designed in a variety of different configurations. Thus, the following detailed description of embodiments of the application provided in the accompanying drawings is not intended to limit the scope of the claimed subject application, but is merely representative of selected embodiments of the application. Based on the embodiments of the application, all other embodiments obtained by a person skilled in the art without creative efforts belong to the scope of the application.

It should be noted that similar reference numerals and letters in the following drawings represent similar items, and therefore, once a term is defined in one drawing, it is not necessary to further define and interpret the same in the subsequent drawings. meanwhile, in the description of the application, the terms "first," "second," "the I-th stage, "the II-th stage," "the III-th stage," "the I-th," "the II-th," and the like are used only for distinguishing such description, but are not to be construed as indicating or implying relative importance.

FIG. 1 illustrates a block diagram of an electronic device 100 applicable to an embodiment of the application. As shown in FIG. 1, the electronic apparatus 100 may include a storage 110, a storage controller 120, a processor 130, a display screen 140, and a cross-row time delay integration apparatus. For example, the electronic device 100 may be a cross-row time delay integration camera, a controller for controlling a cross-row time delay integration camera, or other electronic devices for controlling a cross-row time delay integration camera.

The memory 110, the storage controller 120, the processor 130, and the display screen 140 are electrically connected directly or indirectly to enable transmission or interaction of data. For example, the elements may be electrically connected by one or more communication buses or signal buses. The cross-row time delay integration method includes at least one software function module, such as a software function module or a computer program, which can be stored in the memory 110 in software or firmware manner.

The memory 110 may store various software programs and modules, such as cross-row time delay integration methods, apparatus, and camera corresponding program instructions/modules provided by embodiments of the application. The processor 130 executes various functional applications and data processing by running software programs and modules stored in the memory 110 to implement the cross-row time delay integration method in the embodiments of the application. The memory 110 may include, but is not limited to, random access memory (RAM), read only memory (ROM), programmable read-only memory (PROM), erasable programmable read-only memory (EPROM), electric erasable programmable read-only memory (EEPROM), and the like.

The processor 130 may be an integrated circuit chip having signal processing capability. The processor may be a general-purpose processor, including a central processing unit (CPU), a network processor (NP), and the like; and may also be a digital signal processor (DSP), an application specific integrated circuit (ASIC), a field programmable gate array (FPGA) or other programmable logic apparatus, discrete gate or transistor logic device, discrete hardware components. The methods, steps, and logic block diagrams of the disclosure in the embodiments of the application may be implemented or performed. A general purpose processor may be a microprocessor or the processor may be any conventional processor or the like.

The electronic apparatus 100 applied in the embodiments of the application is to realize a cross-row time delay integration method, and can also be provided with a self-display function, wherein the display screen 140 can provide an interactive interface (eg, a user operation interface) between the electronic apparatus 100 and a user or be used for displaying image data to a user for reference. For example, a cross-row time delay integration apparatus can display an original image collected by photoelectric conversion and a complete image generated after energy integration.

Before introducing a specific embodiment of the application, it is to be noted that the application relates to the technical field of computer technology, electronic technology, image processing and the like. In the implementation process of the application, the application of a plurality of software function modules can be involved. Applicant believes that a person skilled in the art can fully utilize the software programming skill in the application to implement the application in combination with the existing well-known technology, such as after careful reading of the application file and accurately understand the implementation principle of the application and the purpose of the invention, and the software functional modules referred to by the application of the application are all within the scope, and the applicant is no longer enumerated.

The cross-row time delay integration camera applied in the embodiments of the application can be a camera with an area array image energy transfer structure. The imaging target surface is divided into k integral piece domains according to the specification of I rows and J columns, and the k integral piece domains can be continuously distributed in space and can also be distributed discontinuously. The direction of the cross-row integration is the direction of the scanning motion, ie, the moving direction of the target region needing to be shot relative to the cross-row time delay integration camera.

First Embodiment

Figure 2:
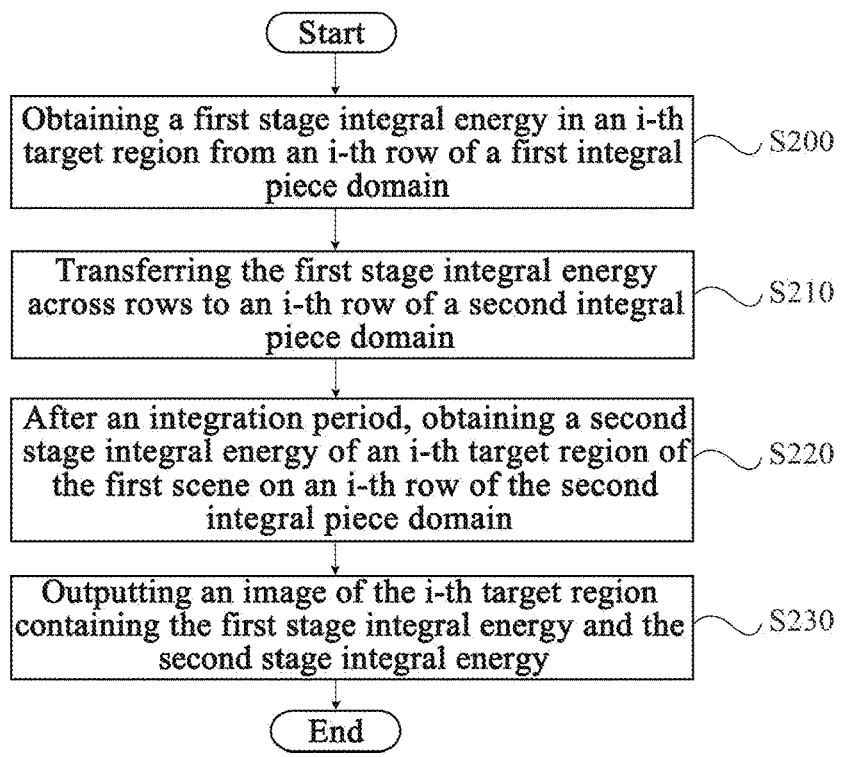
FIG. 2 is a flowchart of a cross-row time delay integration method according to a first embodiment of the application.

Referring to FIG. 2, the embodiment of the invention provides a cross-row time delay integration method applied to a cross-row time delay integration camera, and the method includes the following steps:

S200: obtaining a first stage integral energy in an i-th target region from an i-th row of a first integral piece domain;

In this embodiment, the i-th target region may be a region of an i-th row of the first integral piece domain corresponding to a photographing object in a first scene, and the first integral piece domain may be a portion of photosensitive surface array of the cross-row time delay integration camera.

In the embodiment, the camera surface array (imaging target surface) is divided into a plurality of integral piece domains for imaging, each integral piece domain is divided into a plurality of rows of imaging regions, and the i-th row of the first integral piece domain may refer to any one of the plurality of rows of imaging regions of the first integral piece domain, eg, may be a first row, or a second row, or an m-th row; Any of the plurality of rows of imaging regions in the plurality of rows of imaging regions of the first integral piece domain may also be referred to, for example, from row 1 to row 2, or from row 1 to row 3, or from row 2 to row 3, or from row 1 to m-th row. It is to be understood that a plurality of rows of imaging regions on an integral piece domain are always within a same integration period, imaging a target region corresponding to its position and obtaining stage integral energy. The number of rows of imaging regions in an operating state (for imaging and obtaining energy) may be a single row, such as a first row; may also be a plurality of rows, such as row 1 to m-th row; may be a continuous plurality of rows, such as row 1, row 2, and row 3; and may also be a plurality of spaced rows, such as row 1, row 3, and row 5.

It is understood that each integral piece domain may also be divided into multiple rows, multiple columns of imaging regions, and the number of rows of each of the integral piece domains are the same, etc. An integral piece domain coordinate system can be formed on each integral piece domain, wherein the photosensitive unit located in the (i,j) position in each integral piece domain coordinate system, namely the photosensitive unit in the i-th row and the j-th column of each integral piece domain, the photosensitive unit located at each coordinate position can be independently used for working (imaging and obtaining stage integral energy) or non-working.

During shooting, the shooting object and the camera move relative to each other at a certain speed. At a first moment, a shooting area of an i-th row on a first integral piece domain corresponding to the camera is an i-th target region of a first scene, the i-th target region is imaged on an i-th row of the first integral piece domain, and an energy signal carrying the image information of the i-th target region can be obtained through photoelectric conversion, that is, the first stage integral energy.

In the embodiment, the first moment can refer to the first integration period when the camera just starts to work, and can also refer to a certain integration period after the camera works for a period of time.

In the embodiment, one integration period can be understood as the CCD pixel is started for the first exposure until the exposure energy is transferred out, zero clearing, and the second exposure is prepared.

It is to be understood that the i-th row of the first integral piece domain may refer to any row of active imaging regions on the first integral piece domain, ie, at the first time, each row of active imaging regions on the first integral piece domain is active. In particular, If there is a target imaging on the first row to the 5th row of the first integral piece domain at a first time, for example, no target imaging on the 6th row and row after the 6th row of the first integral piece domain (it can be understood that no image after 6th row is needed, or the imaging region corresponding to the 6th row of the first piece domain overlaps the target region of the first row of the second integral piece domain, and therefore, the image after 6th row is not needed.) At the moment, no energy is acquired on all the rows after the 6th row and the 6th row, then at the first time, the first stage integral energy obtained on all the rows after the 6th row and the 6th row can be considered to be 0.

It should be noted that the length of the integral piece domain on the camera in the present embodiment can be different in the relative motion direction, the width of each row of imaging regions on each integral piece domain can also be different, and the size can be adjusted according to the actual shooting requirements.

S210: transferring the first stage integral energy across rows to an i-th row of a second integral piece domain;

In the embodiment, each row of imaging regions of each integral piece domain on the camera surface array can independently carry out photoelectric conversion, energy processing, energy transfer, energy integration and image output. After the first stage integral energy is acquired in the previous step, the first stage integral energy is temporarily stored in the storage unit corresponding to the i-th row of the first integral piece domain, waiting for zero clearing of the photosensitive elements on i-th row of the second integral piece domain, the first stage integral energy is output to the i-th row of the second integral piece domain.

It will be appreciated that if the total number of rows of the imaging region on one integral piece domain is p, the first stage integral energy is transferred from the i-th row of the first integral piece domain to the i-th row of the second integral piece domain, requiring the first stage integral energy to be transferred across p rows. In particular, when only m rows are provided for effective imaging in the p-row imaging region of an integral piece domain (ie, there are m rows of effective imaging regions in the p-row imaging region), the first stage integral energy is also transferred across p rows, and only m rows are effective imaging regions in the crossed P rows. It is understood that p is greater than or equal to m.

In the embodiment, each row of active imaging regions on the camera operates, Specifically, the energy obtained by imaging on the first row of the first integral piece domain is transferred across p rows to the first row of the second integral piece domain, the energy obtained on the second row of the first integral piece domain is transferred across p rows to the second row of the second integral piece domain, and so on, the first stage integral energy of each row on the first integral piece domain is transferred across p rows to the corresponding row of the second integral piece domain at the same time. It is to be understood that the information carried by the energy obtained by the i-th row of imaging on the plurality of integral piece domains corresponds to the i-th target region of the first scene.

In this embodiment, in particular, each row of the integral piece domain includes an energy storage region in addition to the imaging region. When the transfer of the cross-row integral energy is carried out, the stage integral energy obtained by imaging of the i-th row of imaging region of the previous integral piece domain can be transferred into the energy storage region of the row, so as to prepare transfer to the i-th row imaging element of next integral piece domain, and the energy in the row of imaging region is cleared to zero so as to prepare the photosensitive imaging of the next target region. It is to be understood that the acquisition (photosensitive imaging) of the stage integral energy is performed on the imaging region of each row of the integral piece domain, while the transfer of the stage integral energy is performed within the energy storage region of each row of the integral piece domain. The energy storage region of each row of the integral piece domain can be an energy storage circuit connected with a photosensitive element of the integral piece domain, and can also be a storage medium such as a computer hard disk.

S220: after an integration period, obtaining a second stage integral energy of an i-th target region of the first scene on an i-th row of the second integral piece domain;

It is to be understood that this second stage integral energy may be the accumulation of the first stage integral energy and the second stage integral energy of the same target region, but may only be the second stage integral energy, the accumulation of the first stage integral energy may be achieved in the energy processing unit, and the first stage integral energy and the second stage integral energy may be the original energy or the energy through the specified processing.

In the embodiment, the integration period may be the refresh frequency of the camera, ie, the minimum time interval required between two imaging of the photoelectric element.

Since the camera moves relative to the target at a certain speed, after an integration period, at the second stage integration start time, the first integral piece domain of the camera has moved above the next position of the shot object, and the second integral piece domain is moved above the first scene, that is, at the second stage integration start time, the first scene is imaged on the second integral piece domain. At this time, not only the second stage integral energy imaged in the i-th target region is stored on the i-th row of the second integral piece domain, but also the first stage integral energy transferred from the i-th row of the first integral piece domain at the first time is also stored.

It is understood that the distance between the i-th row of the first integral piece domain and the i-th row of the second integral piece domain of the camera corresponds to the distance that the camera in the imaging field of view moves relative to the target region within an integration period.

S230: outputting an image of the i-th target region containing the first stage integral energy and the second stage integral energy.

In the embodiment, the first stage integral energy and the second stage integral energy are integrated to obtain an i-th target region image containing the first stage integral energy and the second stage integral energy. It is to be understood that when the integral stage number k of the camera is 2, the i-th target region image is the integral of the first stage integral energy and the second stage integral energy; when the integral stage number k of the camera exceeds 2, the i-th target region image can also contain the stage integral energy obtained by imaging on the other integral piece domains.

In the embodiment, the camera may set an integral stage number k, for example, the camera surface array is divided into k effective integral piece domains, Then, the time at which the first stage integration is photosensitive, through k integration periods, k stage integral energy is acquired in a total, and the k stage integral energy is respectively obtained by imaging the same i-th target region in the i-th row of the k effective integral piece domains, through k-1-time cross-row output transfer, and the k stage integral energy is concentrated on the i-th row of the last integral piece domain, and then the i-th row of the last integral piece domain outputs an image containing the k stage integral energy. It is to be understood that if there are m rows of effective imaging regions on each integral piece domain to work at the same time, then the last integral piece domain outputs an image of m rows undergoing k stage integration. It is understood that the number of rows of each integral piece domain is greater than or equal to the row number m of the output image.

Applicants have found through experiment research that, in the prior art, since the stage integral energy of the camera is always transferred from the previous row to the adjacent subsequent row, this results in that when the relative motion speed of the camera and the photographing target exceeds the refresh speed of the photoelectric element, the i-th target region corresponding to the first integral row at the first moment can be directly moved across the second row to the corresponding position of the third row after an integration period, at this time, only the first stage integral energy transferred from the first row is stored on the second row, but the i-th target region cannot be imaged for the second time, and the image energy of the non-same region is integrated; after passing through the second integration period, the i-th target region supposed to correspond to the third integral row has moved to the position corresponding to the fifth integral row crossing the fourth integral row, so that the third integral row also cannot image the i-th target region. And so on, in this case, except that the first stage integral energy obtained by imaging on the first integral row is normal, each integral row of the i-th target region can not smoothly image the i-th target region on the basis of the first stage integral energy, and the result is that the output integral image does not only include the energy of the i-th target region, but containing a mixture of energies from different target regions, so that the output image quality is poor, and the correct significance of the time delay integration is also not established.

The cross-row time delay integration method provided by the embodiment of the disclosure is to solve the problems existing in the prior art, through cross-row time delay integration, under the environment of high-speed relative motion, the cross row number is set according to the relation between the relative motion speed and the camera refresh frequency, so that after each integration period, the energy of imaging on the upper integral row of the target region can be transferred to the next integral row corresponding to the target region across rows, and the correct energy integration process in the high-speed motion environment is realized.

Figure 3:
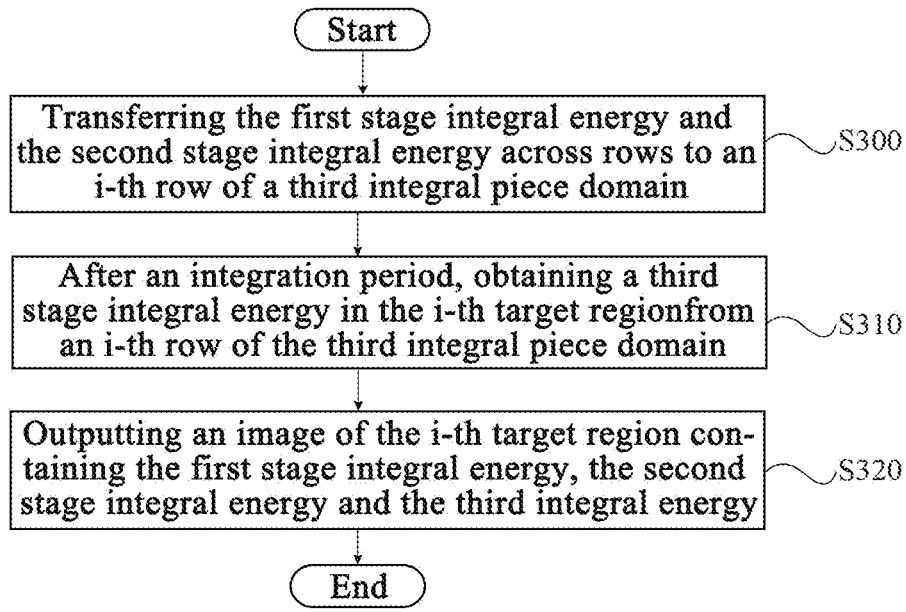
FIG. 3 is a block flow diagram of the steps S300 to S320 provided in the first embodiment of the application.

Referring to FIG. 3, in the embodiment, after the step S220, the following steps may also be included:

S300: transferring the first stage integral energy and the second stage integral energy across rows to an i-th row of a third integral piece domain;

In the embodiment, when the integral stage number k is greater than 2, the other integral piece domains after the second integral piece domain need to participate in shooting work, so that after the second stage integral energy is acquired on the i-th row of the second integral piece domain, the first stage integral energy transferred to the i-th row of the second integral piece domain and the second stage integral energy just imaged are transferred to the i-th row of the third integral piece domain.

S310: after an integration period, obtaining a third stage integral energy in the i-th target region from an i-th row of the third integral piece domain;

After an integration period, the i-th row of the third integral piece domain is moved above the i-th target region of the first scene, and at the moment, the i-th row of the third integral piece domain is used for imaging the i-th target region to obtain the third stage integral energy. It is understood that at this time, the i-th row of the third integral piece domain stores a first stage integral energy, a second stage integral energy, and a third stage integral energy.

S320: outputting an image of the i-th target region containing the first stage integral energy, the second stage integral energy and the third integral energy.

In the embodiment, when the integral stage number k is 3, the output i-th target region image is obtained by integrating the first stage integral energy, the second stage integral energy and the third stage integral energy; and when the integral stage number k is greater than 3, the output i-th target region image is obtained by integrating the first stage integral energy, the second stage integral energy, the third stage integral energy, and the obtained other stage integral energy.

Figure 4:
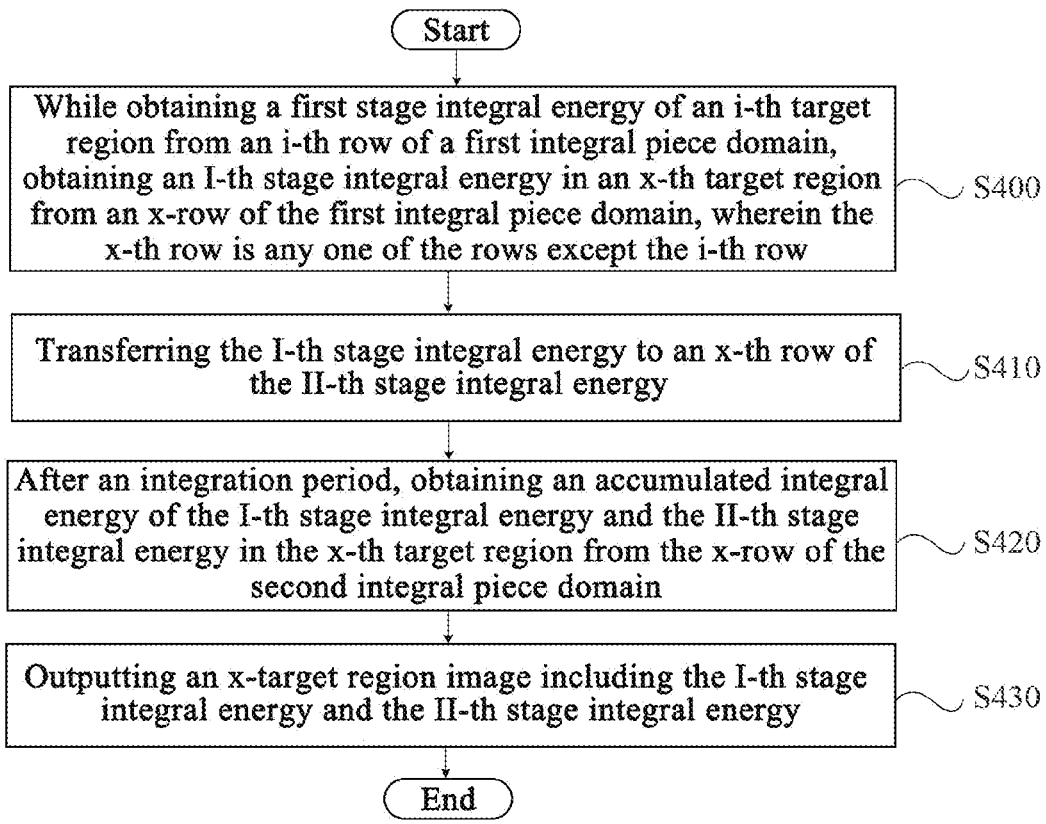
FIG. 4 is a block flow diagram of the steps S400 to S430 provided in the first embodiment of the application.

Referring to FIG. 4, in the embodiment, after the step S210, the following steps may also be included:

S400: while obtaining a first stage integral energy of an i-th target region from an i-th row of a first integral piece domain, obtaining an I-th stage integral energy in an x-th target region from an x-row of the first integral piece domain, wherein the x-th row is any one of the rows except the i-th row;

In the embodiment, at the same time of S220, the x-th row of the first integral piece domain images the x-th target region and the I-th stage integral energy is acquired, and after an integration period, the first integral piece domain moves to the upper part of the new imaging target region in the forward direction, and the second integral piece domain moves to the upper part of an imaging target region of the first integral piece domain in the previous integration period. The x-th row of the second integral piece domain images the x-th target region and acquires the II-th stage integral energy.

In particular, the i-th target region and the x-th target region can be spatial-space-free neighborhood relations, and can also be spatially separated, so that multiple target regions continuous in space can be shot, or multiple target regions of space intervals can be shot.

S410: transferring the I-th stage integral energy to an x-th row of the second integral piece domain;

In this embodiment, after obtaining the I-th stage integral energy of the x-th row of the first integral piece domain, the x-th row of the II-th stage integral energy can receive the I-th stage integral energy transferred by the x-th row of the first integral piece domain.

S420: after an integration period, obtaining an accumulated integral energy of the I-th stage integral energy and the II-th stage integral energy in the x-th target region from the x-row of the second integral piece domain;

The camera and the target continue to move relative to each other, after an integration period, the first integral piece domain moves to other regions, and the x row of the second integral piece domain is moved above the corresponding x-th target region, and the x row of the second integral piece domain is used for imaging the x-th target region.

S430: outputting an x-target region image including the I-th stage integral energy and the II-th stage integral energy.

In the embodiment, the integral piece domain is the division of the camera imaging image element matrix, and the i-th target region and the x target region are two strip imaging regions corresponding to two rows of images in an imaging region covered by an integral piece domain, and belongs to two rows in m rows.

In other words, in the embodiment, the first stage integral energy of each row on the first integral piece domain is acquired at the same time, and the integral energy of each row on the first integral piece domain is transferred to the corresponding row of the second integral piece domain. Then, after an integration period, the integral energy accumulated by each row on the second integral piece domain can be acquired at the same time.

Figure 5:
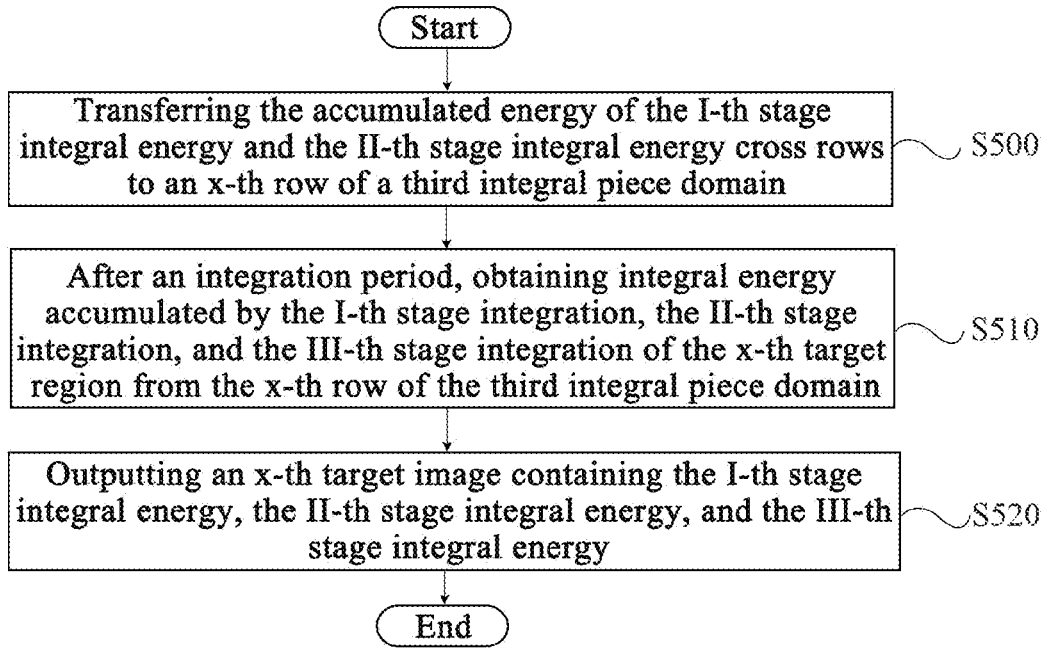
FIG. 5 is a block flow diagram of the steps S500 to S520 provided in the first embodiment of the application.

Referring to FIG. 5, in the embodiment, after the S420, the following steps may also be included:

S500: transferring the accumulated energy of the I-th stage integral energy and the II-th stage integral energy cross rows to an x-th row of a third integral piece domain;

S510: after an integration period, obtaining integral energy accumulated by the I-th stage integration, the II-th stage integration, and the III-th stage integration of the x-th target region from the x-th row of the third integral piece domain;

S520: outputting an x-th target image containing the I-th stage integral energy, the II-th stage integral energy, and the III-th stage integral energy.

In the embodiment, when the integral stage number k is 3, the output x-th target image is obtained by integrating the I-th stage integral energy, the II-th stage integral energy and the III-th stage integral energy; and when the integral stage number k is greater than 3, the output x-th target image is obtained by integrating the I-th stage integral energy, the II-th stage integral energy, the III-th stage integral energy, and the obtained other stage integral energy.

Figure 6:
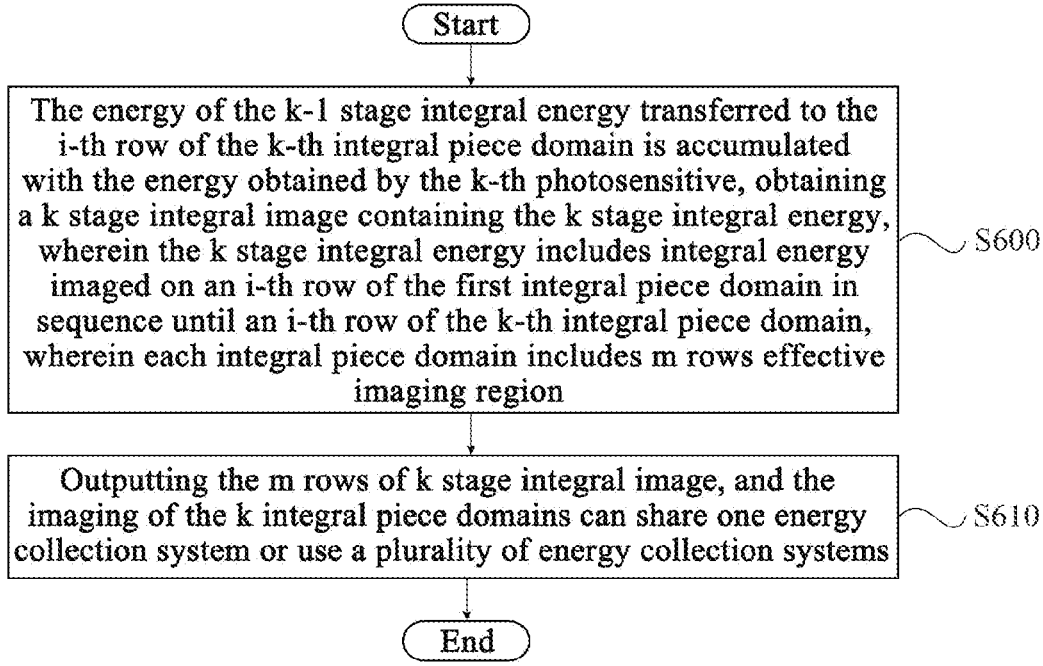
FIG. 6 is a block flow diagram of the steps S600 to S610 provided in the first embodiment of the application.

Referring to FIG. 6, in the embodiment, after the S230, the following steps may also be included:

S600: the energy of the k−1 stage integral energy transferred to the i-th row of the k-th integral piece domain is accumulated with the energy obtained by the k-th photosensitive, obtaining a k stage integral image containing the k stage integral energy, wherein the k stage integral energy includes integral energy imaged on an i-th row of the first integral piece domain in sequence until an i-th row of the k-th integral piece domain, wherein each integral piece domain includes m rows of effective imaging region;

In the embodiment, the k stage integral energy includes the first stage integral energy, which is obtained by imaging the i-th target region on the i-th row of the first integral piece domain and up to the i-th row of the k-th integral piece domain, in sequence until the accumulation of the k-th integration energy is accumulated.

S610: outputting the m rows of k stage integral image, and the imaging of the k integral piece domains can share one energy collection system or use a plurality of energy collection systems.

In the embodiment, the first integral piece domain and the k-th integral piece domain each include an m rows of effective imaging region. It is to be understood that the initial time point of photosensitive of the first integral piece domain is the start time point of the first stage integration period, the start time point of photosensitive of the second integral piece is the end time point of the first stage integration period and the start time point of the second stage integration period, in one integration period, imaging of the current scene is completed, and moving to the next scene to wait for imaging. It is to be understood that the ordering of the first scene and the second scene is the imaging scene corresponding to the time backward in the first integral piece domain and refers to the sequential relationship of the k integral piece domains; After k integration periods, the relative motion of the camera and the imaging scene spans the distance of k integral piece domains, the k stage integration of the m rows of images corresponding to the m target regions in the first scene is completed, at the moment, the first integral piece domain is located above the k+1 scene, the k-th integral piece domain is located above the second scene, and the to-be-output is the m rows of image after k stage integration is completed by the first scene. In this cyclic mode, continuous cross-row time delay integral imaging of all target regions is completed.

In the embodiment of the disclosure, in a specific implementation of cross-row time delay integration, the energy transferred by the previous integral piece domain to the corresponding row of the next integral piece domain can be an analog quantity, such as charge, current and voltage; and can also be a digital quantity, such as a high level and a low level. In the transmission mode, the stage integral energy that is transferred from the photosensitive unit located at the (i,j) position in the previous integral piece domain coordinate system to the photosensitive unit located at the (i,j) position in the next integral piece domain coordinate system, can be transferred through a physical connection mode, for example, circuit connection between the two units; it can also be transferred by digital quantities, for example, the stage integral energy acquired by the previous photosensitive unit can be processed by a computer, converted into a digital signal, and then sent to the next photosensitive unit across the rows.

In the embodiment, the stage integral energy which is transferred from the photosensitive unit located in the (i,j) position in the previous integral piece domain coordinate system to the photosensitive unit located at the (i,j) position in the next integral piece domain coordinate system, can be the original charge energy, for example, the original charge energy obtained by photoelectric conversion of the previous photosensitive unit is directly transmitted to the next photosensitive unit; and it can also be the energy after preset processing the original energy. The preset processing can be to process the original energy by amplifying, filtering circuit and the like, and can also carry out analog-to-digital conversion on the original energy through a computer and the like.

In the embodiment, the process of implementing k stage integration on the photosensitive unit located in the (i,j) position in the previous integration piece domain coordinate system can be completed in a processing unit outside the photosensitive unit. For example, in the previous integral piece domain coordinate system (i,j) position, the photosensitive unit energy in the position is output to a processing module, and is put into a memory after being processed, and performing integral processing with the processed data of the photosensitive energy which is already stored in the memory, and is located in the (i,j) position in the previous integral piece domain coordinate system, and the result is stored in the memory. This integration manner may be extended to k stage integration.

In the embodiment, the lens of the cross-row time delay integration camera may be a cylindrical lens; may also be a spherical lens; may be a combination of cylindrical lenses, such as a lens group consisting of a plurality of cylindrical lenses; may also be a lens group consisting of a plurality of spherical lenses; for example, a lens group consisting of a plurality of spherical lenses, it may also be a combination of a cylindrical lens and a spherical lens, such as a lens group including a cylindrical lens and a spherical lens. It is understood that the lens of the cross-row time delay integration camera may also include an aspherical lens or a lens group. It can be appreciated that the collection system of the optical energy of the cross-row time delay integration camera can select a lens formed by various optical systems according to needs, such as a telecentric lens and the like.

According to the method provided by the embodiment of the disclosure, cross-row integration is carried out on the energy obtained by imaging, and compared with the prior art, the target shooting can be carried out in a higher-speed environment, the division of the integral piece domain and integral row can be realized through a switch integrated circuit or a logic programming circuit (FPGA) on an existing photoelectric apparatus, and the method has excellent imaging quality and wide applicability.

Second Embodiment

Figure 7:
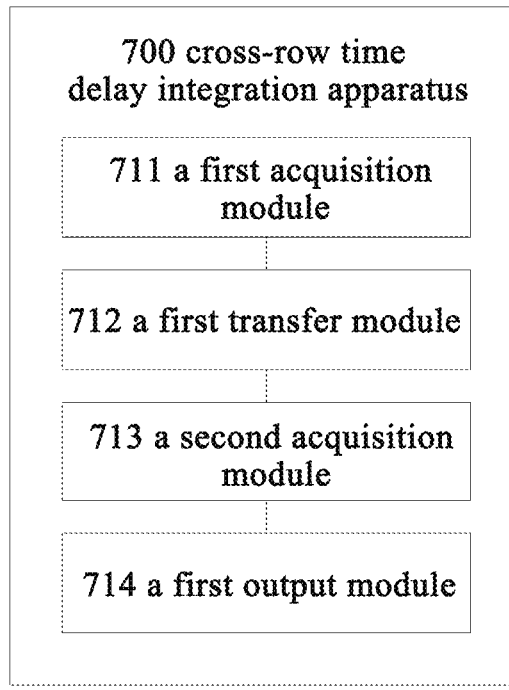
FIG. 7 is a block diagram of a cross-row time delay integration apparatus according to a second embodiment of the application.

Please refer to FIG. 7, which provides a cross-row time delay integration apparatus 700, which includes:

a first acquisition module 711, configured to obtain a first stage integral energy in an i-th target region from an i-th row of a first integral piece domain;

a first transfer module 712, configured to transfer the first stage integral energy across rows to an i-th row of a second integral piece domain;

a second acquisition module 713, configured to obtain the first stage integral energy and an second stage integral energy accumulated in the i-th target region from the i-th row of the second integral piece domain, after an integration period;

a first output module 714, configured to output an image of the i-th target region containing the first stage integral energy and the second stage integral energy.

Figure 8:
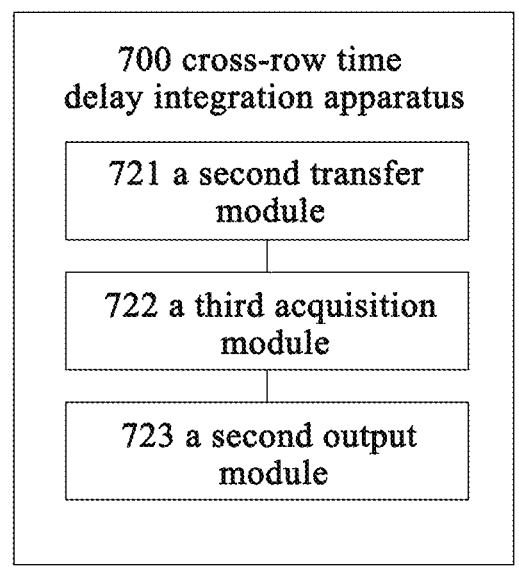
FIG. 8 is a block diagram of a second cross-row time delay integration apparatus according to a second embodiment of the application.

Referring to FIG. 8, in the embodiment, further, the cross-row time delay integration apparatus 700 may further comprise:

a second transfer module 721, configured for transferring the first stage integral energy and the second stage integral energy accumulated across rows to an i-th row of a third integral piece domain;

a third acquisition module 722, configured for obtaining the first stage integral energy, the second stage integral energy and the third stage integral energy accumulated in the i-th target region from the i-th row of the third integral piece domain, after an integration period;

a second output module 723, configured for outputting an image of the i-th target region containing the first stage integral energy, the second stage integral energy and the third stage integral energy.

Figure 9:
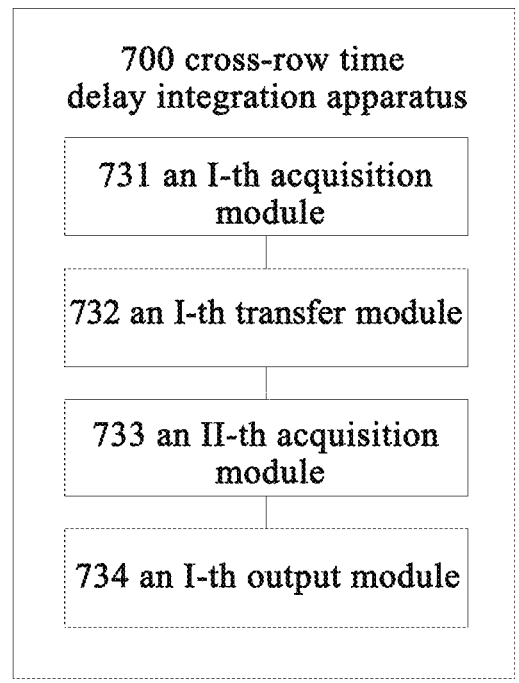
FIG. 9 is a block diagram of a third cross-row time delay integration apparatus according to a second embodiment of the application.

Referring to FIG. 9, in the embodiment, further, the cross-row time delay integration apparatus 700 may further includes:

an I-th acquisition module 731, configured for while obtaining the first stage integral energy in the i-th target region from an i-th row of the first integral piece domain, obtaining an I stage integral energy in an x-th target region from an x-th row of the first integral piece domain, wherein the x-th row is any row other than the i-th row;

an I-th transfer module 732, configured for transferring the I-th stage integral energy across rows to an x-th row of the second integral piece domain;

an II-th acquisition module 733, configured for obtaining the I-th stage integral energy and an II-th stage integral energy accumulated in the x-th target region from the x-th row of the second integral piece domain, after an integration period;

an I-th output module 734, configured for outputting an image of the x-th target region containing the I-th stage integral energy and the II-th stage integral energy.

Figure 10:
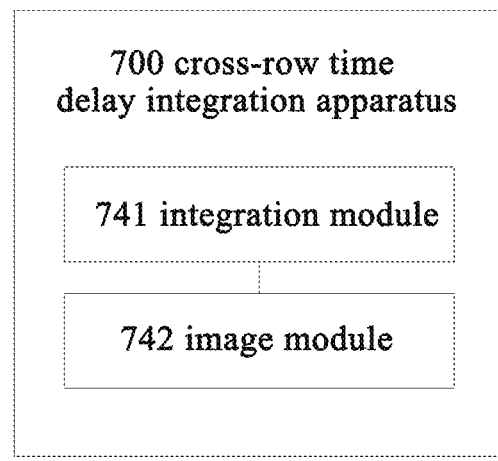
FIG. 10 is a structural block diagram of a fourth cross-row time delay integration apparatus according to a second embodiment of the application.

Referring to FIG. 10, in the embodiment, further, the cross-row time delay integration apparatus 700 may further include:

an integration module 741, configured for accumulating an k−1 stage integral energy transferred to an i-th row of an k-th integral piece domain and energy obtained by a k-th exposure, obtaining a k stage integral image including a k stage integral energy, wherein the k stage integral energy includes an integral energy of an imaging of the i-th target region on the i-th row of the first integral piece domain in sequence up to the i-th row of the k-th integral piece domain, each of the integral piece domain includes a k stage integral image of m rows formed by an effective imaging region of m rows;

an image module 742, configured for outputting the k stage integral image of m rows, imaging of k integral piece domains can share one energy collection system or use a plurality of energy collection system

Third Embodiment

Figure 11:
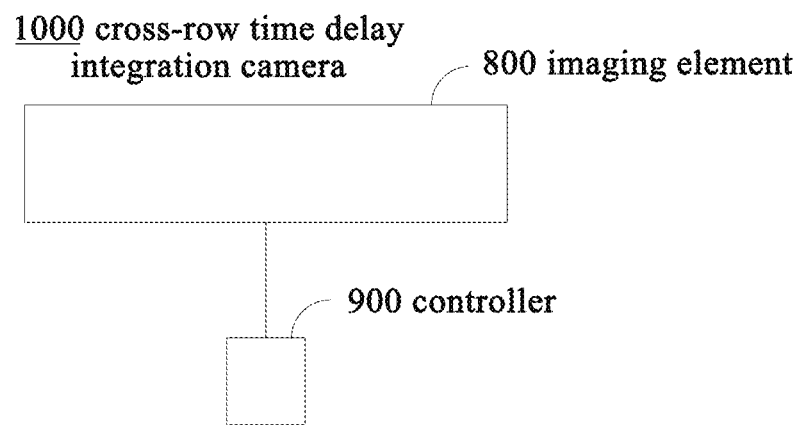
FIG. 11 is a schematic structural diagram of a cross-row time delay integration camera according to a third embodiment of the present application.

Please refer to FIG. 11, which provides a cross-row time delay integration camera 1000, which can be used for realizing the cross-row time delay integration method provided by the first embodiment of the application. The cross-row time delay integration camera 1000 includes an imaging element 800 and a controller 900, the imaging element 800 and the controller 900 are connected. In the embodiment, the imaging element 800 can be used for photosensitive imaging and obtaining stage integral energy.

Figure 12:
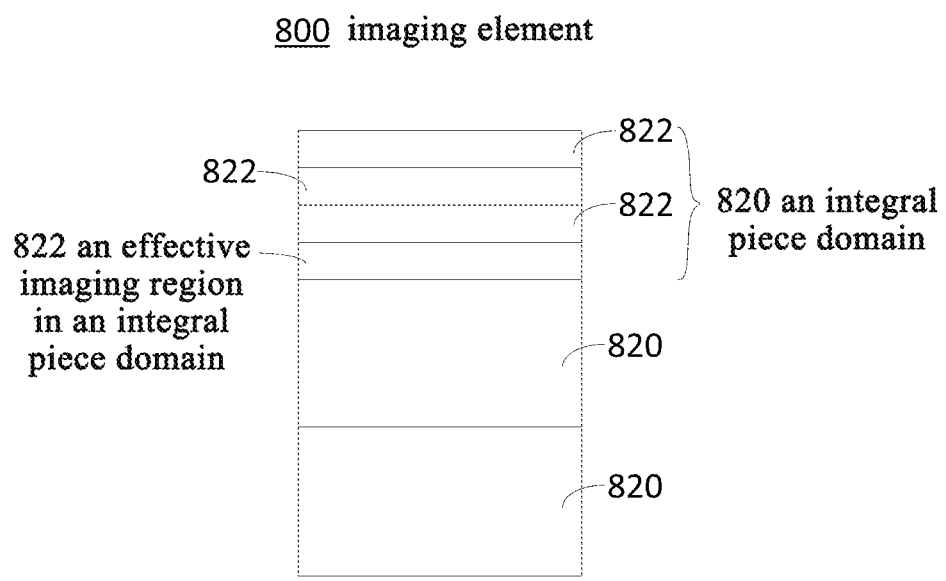
FIG. 12 is a schematic structural diagram of an imaging element according to a third embodiment of the application.

Referring to FIG. 12, the imaging element 800 includes a plurality of integral piece domains 820, each of which includes a plurality of rows of effective imaging regions 822, the controller 900 used for individually controlling the plurality of rows of effective imaging regions 822 to perform photoelectric conversion, energy transfer, energy processing, energy integration, and image output, respectively. Wherein, the number of the integral piece domains 820, the number of rows of the effective imaging regions 822 on each integral piece domain 820, the number of rows of energy transfer cross rows, and the integral stage number of energy integration can all be edited and set by the controller 900.

In particular, the imaging element 800 may further include a plurality of columns of the integral piece domain 820, performing lateral expansion of the camera array in a direction perpendicular to the direction of motion to form an integral piece domain 820 coordinate system, wherein the photosensitive units corresponding to each coordinate point position can be independently controlled by the controller 900, and can be suitable for shooting relative motion in a complex direction.

In the embodiment, the controller 900 can be a PCB circuit or an FPGA circuit, by performing logic programming on the circuit, the number of the integral piece domains 820, the number of rows of effective imaging regions 822 on each integral piece domain 820, the number of rows of energy transfer cross rows, the function of energy processing and the flexible editing of the integral stage number of energy integration are realized.

The above description is only a preferred embodiment of the application and is not intended to limit the application. For a person skilled in the art, the application may have various modifications and variations. Any modifications, equivalents, improvements, etc., made within the spirit and principles of the application are intended to be included within the scope of the application.

INDUSTRIAL APPLICABILITY

According to the cross-row time delay integration method, apparatus and the camera provided by the embodiment of the disclosure, the first stage integral energy of an i-th target region on the i-th row of the first integral piece domain is obtained; transferring the first stage integral energy across rows to an i-th row of a second integral piece domain; after an integration period, obtaining a second stage integral energy imaged on an i-th row of the second integral piece domain; and finally, outputting a first target image containing the first stage integral energy and the second stage integral energy. Compared with the prior art, through cross-row integration of the energy obtained by imaging, the target shooting can be carried out in a higher-speed environment, and the method can be implemented on the existing photoelectric apparatus through logic programming, and has excellent imaging quality and wide applicability.

What is claimed is:

1. Cross-row time delay integration method, which is applied to cross-row time delay integration camera, wherein the method comprising:
    obtaining a first stage integral energy in an i-th target region from an i-th row of a first integral piece domain;
    transferring the first stage integral energy across rows to an i-th row of a second integral piece domain;
    obtaining the first stage integral energy and a second stage integral energy accumulated in the i-th target region from the i-th row of the second integral piece domain, after an integration period;
    outputting an image of the i-th target region containing the first stage integral energy and the second stage integral energy.

2. According to the method of claim 1, wherein a camera array of the cross-row time delay integration camera is divided into a plurality of integral piece domains used for imaging, each of the integral piece domain comprises a plurality of rows used for imaging.

3. According to the method of claim 2, wherein the number of rows of each of the integral piece domain is equal.

4. According to the method of claim 1, wherein after the step of obtaining the first stage integral energy and the second stage integral energy accumulated in the i-th target region from the i-th row of the second integral piece domain, after an integration period, the method further includes:
    transferring the first stage integral energy and the second stage integral energy accumulated across rows to an i-th row of a third integral piece domain;
    obtaining the first stage integral energy, the second stage integral energy and the third stage integral energy accumulated in the i-th target region from the i-th row of the third integral piece domain, after an integration period;
    outputting an image of the i-th target region containing the first stage integral energy, the second stage integral energy and the third stage integral energy.

5. According to the method of claim 1, wherein the method further includes:
    while obtaining the first stage integral energy in the i-th target region from an i-th row of the first integral piece domain, obtaining an I stage integral energy in an x-th target region from an x-th row of the first integral piece domain, wherein the x-th row is any row other than the i-th row;
    transferring the I-th stage integral energy across rows to an x-th row of the second integral piece domain;
    obtaining the I-th stage integral energy and an II-th stage integral energy accumulated in the x-th target region from the x-th row of the second integral piece domain, after an integration period;
    outputting an image of the x-th target region containing the I-th stage integral energy and the II-th stage integral energy.

6. According to the method of claim 5, wherein after the step of obtaining the I-th stage integral energy and an II-th stage integral energy accumulated in the x-th target region from the x-th row of the second integral piece domain, the method further includes:
    transferring the I-th stage integral energy and the II-th stage integral energy accumulated across rows to an x-th row of a third integral piece domain;
    obtaining the I-th stage integral energy, the II-th stage integral energy and a III-th stage integral energy accumulated in the x-th target region from the x-th row of the third integral piece domain, after an integration period;

outputting an image of the x-th target region containing the I-th stage integral energy, the II-th stage integral energy and the III-th stage integral energy.

7. According to the method of claim 1, wherein the method further includes:

accumulating a k-1 stage integral energy transferred to an i-th row of a k-th integral piece domain and energy obtained by a k-th exposure, wherein obtaining a k stage integral image including a k stage integral energy, wherein the k stage integral energy includes an integral energy of an imaging of the i-th target region on the i-th row of the first integral piece domain in sequence up to the i-th row of the k-th integral piece domain, each of the integral piece domain includes a k stage integral image of m rows formed by an effective imaging region of m rows;

outputting the k stage integral image of m rows, wherein imaging of k integral piece domains shares one energy collection system or uses a plurality of energy collection system.

8. According to the method of claim 1, wherein an stage integral energy correspondingly transferred from a row of an upper integral piece domain to a row of a next integral piece domain is analog quantity or digital quantity;

the energy transferred from a photosensitive unit located at a position (i,j) in an upper integral piece domain coordinate system to a photosensitive unit located at a position (i,j) in a next integral piece domain coordinate system is transferred through a physical connection manner.

9. According to the method of claim 8, wherein the photosensitive unit located at a position (i,j) in the upper integral piece domain coordinate system is connected through a circuit to the photosensitive unit located at a position (i,j) in the next integral piece domain coordinate system.

10. According to the method of claim 8, wherein when transferring energy from a photosensitive unit located at a position (i,j) in the upper integral piece domain coordinate system to a photosensitive unit located at a position (i,j) in the next integral piece domain coordinate system, stage integral energy obtained from the upper photosensitive unit is processed through a computer and is converted to digital signals, and then is sent across rows to the next photosensitive unit.

11. According to the method of claim 1, wherein energy transferred from a photosensitive unit located at a position (i,j) in an upper integral piece domain coordinate system to a photosensitive unit located at a position (i,j) in a next integral piece domain coordinate system is original charge energy, or energy after processing the original charge energy.

12. According to the method of claim 1, wherein lens of the cross-row time delay integration camera is a cylindrical lens, or a spherical lens, or combination of cylindrical lenses, or combination of spherical lenses, or combination of cylindrical lenses and spherical lenses.

13. According to the method of claim 1, wherein when transferring integral energy from an upper integral piece domain to a next integral piece domain, the number of rows crossed is determined through relative motion speed between a target region and the cross-row time delay integration camera, and refresh frequency of the cross-row time delay integration camera.

14. Cross-row time delay integration apparatus, wherein the apparatus comprising:

a first acquisition module, configured to obtain a first stage integral energy in an i-th target region from an i-th row of a first integral piece domain;

a first transfer module, configured to transfer the first stage integral energy across rows to an i-th row of a second integral piece domain;

a second acquisition module, configured to obtain the first stage integral energy and a second stage integral energy accumulated in the i-th target region from the i-th row of the second integral piece domain, after an integration period;

a first output module, configured to output an image of the i-th target region containing the first stage integral energy and the second stage integral energy.

15. Cross-row time delay integration camera, wherein the camera comprising an imaging element and a controller, the imaging element and the controller are connected, the imaging element includes a plurality of integral piece domains, each of the integral piece domain includes a plurality of rows of effective imaging region, wherein the controller is configured to respectively controlling the plurality of rows of effective imaging region for independently photoelectric conversion, energy processing, energy transfer, energy integration and image output, wherein the number of the integration piece domains, the number of rows of the effective imaging region on each of the integral piece domain, the number of rows of energy across-row transfer, and the number of stages of energy integration is edited; under the control of the controller, the cross-row time delay integration camera implements the method of claim 1.

* * * * *